Feb. 18, 1936.  M. NATELLA  2,031,059
TRANSMISSION MECHANISM
Filed April 7, 1933
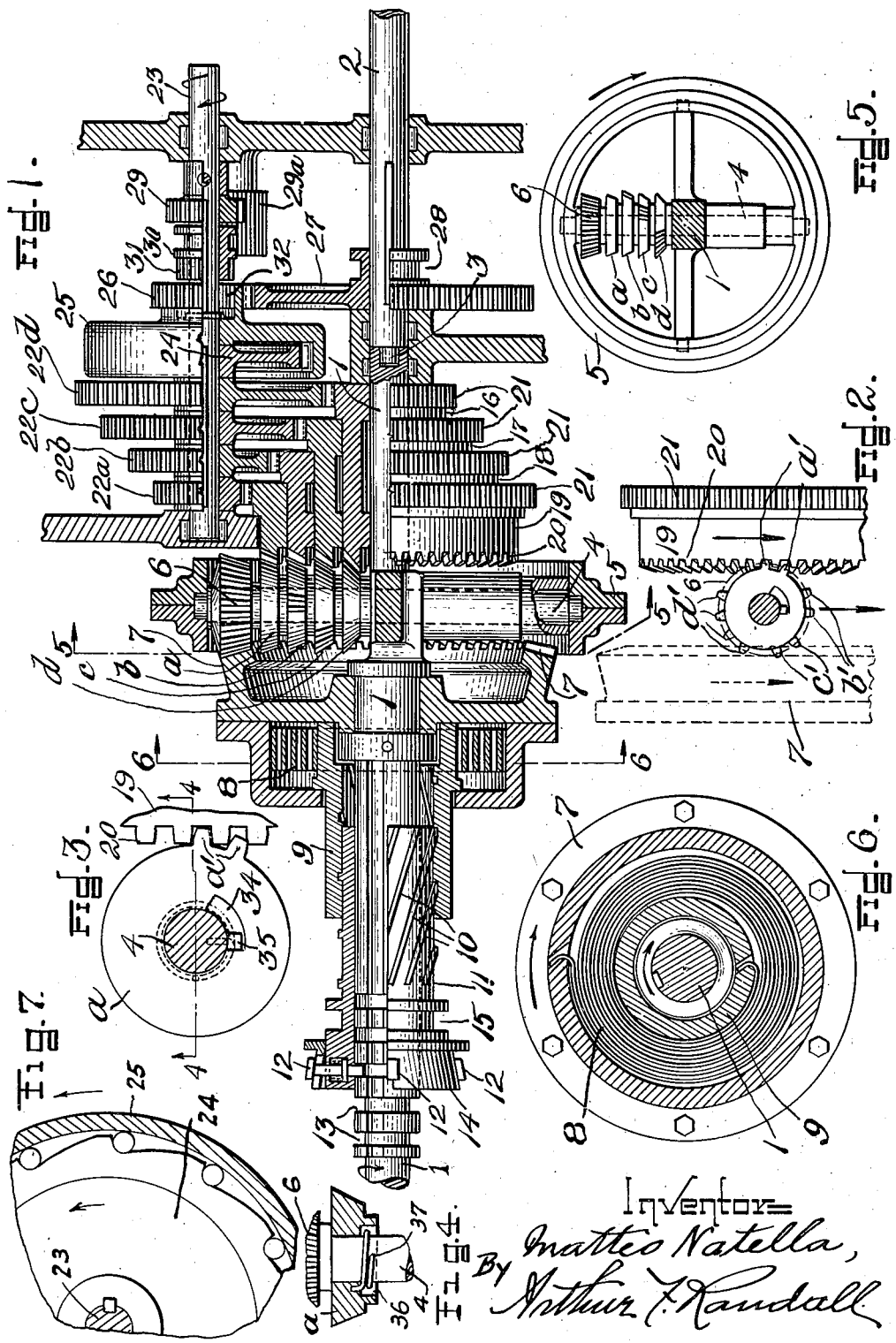

Patented Feb. 18, 1936

2,031,059

UNITED STATES PATENT OFFICE 2,031,059

TRANSMISSION MECHANISM

Matteo Natella, Salerno, Italy

Application April 7, 1933, Serial No. 664,945
In Italy May 12, 1932

7 Claims. (Cl. 74—337)

My invention relates to power transmitting mechanisms and particularly to mechanisms of this class such as are incorporated in automobiles and other motor driven vehicles.

The object of my invention is to provide a power transmitting mechanism for connecting a prime power shaft with a driven shaft which will function automatically to vary the degree of power supplied to the driven shaft according to variations in the load imposed by the latter upon said power transmitting mechanism. It is also an object of this invention to provide a mechanism of the character described which can be manually adjusted at will to vary the speed of the driven shaft.

To these ends I have provided an automatic power transmitting mechanism which operates automatically to vary the speed and power of the driven shaft in accordance with variations in the load imposed thereby upon said mechanism and which, in its preferred form, also includes manually adjusted means for controlling the speed of the driven shaft.

Other features of my invention are hereinafter pointed out.

In the accompanying drawing:

Figure 1 is a plan view, partly in section and partly in elevation of a power transmitting mechanism constructed in accordance with my invention.

Figure 2 is a detail hereinafter described.

Figure 3 is a plan view of one of the mutilated gears hereinafter described.

Figure 4 is a section on line 4—4 of Figure 3.

Figure 5 is a section on line 5—5 of Figure 1.

Figure 6 is a section on line 6—6 of Figure 1.

Figure 7 is a sectional detail of the free wheeling clutch hereinafter referred to.

Having reference to the drawing 1 represents the prime power shaft which may be the crank shaft of an internal combustion engine of a motor propelled vehicle and 2 is a driven shaft axially alined opposite one end of prime power shaft 1. Driven shaft 2 is made with a trunnion 3 loosely occupying a socket provided for it in the adjacent end of the prime power shaft 1.

Intermediate its ends prime power shaft 1 is made with a transverse bearing within which is journaled a transverse spindle 4 whose outer end portions are journaled within bearings provided within a ring 5.

Spindle 4 has fast upon its outer end portion a beveled gear 6 meshing with a crown gear 7 that is loosely mounted upon prime power shaft 1. The crown gear 7 is made in two parts which provide between them a chamber within which is arranged a coiled spring 8 whose outer end is fastened to crown gear 7 and whose inner end is fastened to a cylindrical sleeve 9 surrounding prime power shaft 1 and held against endwise movement relatively thereto by crown gear 7 with relation to which, however, it is at times rotated. The hub of crown gear 7 is loosely journaled on the prime power shaft 1, but is held against axial movement thereon by shoulders provided upon said shaft.

The sleeve 9 is formed upon its interior with spiral grooves which are in mesh with spiral ribs 10 provided upon a second sleeve 11 that is connected by straight longitudinal splines with prime power shaft 1. The sleeve 11 supports the sleeve 9 and is slidably splined on prime power shaft 1 so that when it is moved axially on the latter it serves to rotate sleeve 9 relatively to prime power shaft 1 and gear 7 and so that when said sleeve 11 is rotating with prime power shaft 1 and at the same time is held against axial movement thereon it transmits rotary motion to sleeve 9 so that the latter rotates around the axis of shaft 1 in unison with the bodily movement of gear 6 around said axis.

So long as the power stored up in spring 8 equals the load imposed upon the mechanism by driven shaft 2, there is no relative movement between the gears 6 and 7. When, however, the load increases the gear 6 will lag or fall behind the crown gear 7 with the result that spindle 4 is turned in one direction. So also when the load imposed by driven shaft 2 decreases crown gear 7 will lag behind the gear 6 with the result that spindle 4 will be turned in the opposite direction. Thus, so long as the tension of spring 8 equals the load there is no relative movement between gears 6 and 7, but as this load varies the crown gear 7 will move ahead of, or fall behind, the gear 6 and ring 5 during their movement around the axis of prime power shaft 1.

Sleeve 11 extends outside of the sleeve 9 and is provided with a plurality of radially disposed spring pressed bolts 12 whose inner ends co-operate with circumferential grooves 13 formed upon the exterior of the prime power shaft 1. The bolts 12 are provided at their outer ends with heads to co-operate with a conical sleeve 14 that is slidable axially on sleeve 11. When sleeve 14 is manually shifted toward the right, Fig. 1, the bolts 12 are retracted against the pressure of their springs thereby withdrawing their inner ends from the groove 13 occupied by them. It will be clear that when the bolts 12 occupy their retracted positions the sleeve 11 may be moved longitudinally on prime power shaft 1 by means of a shipper member, not shown, engaging a groove 15 provided upon the exterior thereof. It will also be clear that when the sleeve 11 is thus adjusted the effective strength or tension of spring 8 is varied.

The conical sleeve 14 is made with an outwardly extending flange to be engaged by a manually operated shipper member, not shown.

Surrounding the prime power shaft 1 and alongside of spindle 4 are four cylindrical gear members 16, 17, 18 and 19 that are telescopically associated with the innermost member 16 journaled loosely on prime power shaft 1. In other words the outermost member 19 is rotatably supported by member 18; the latter is rotatably supported by the member 17; the member 17 is rotatably supported by the member 16, and the member 16 is rotatably supported by shaft 1. The ends of these members adjacent to spindle 4 are formed each as a beveled gear 20, while the opposite end portion of each is formed as a spur gear 21. The ends of the members 16, 17, 18 and 19 which are nearest spindle 4 are radially alined. The members 16, 17, 18 and 19 are of different lengths, the inner member 16 being longest and the outer member 19 being shortest with the result that the cylindrical gears 21 are of different diameters and stepped as shown in Figure 1.

Each gear 21 is continuously in mesh with one of the gears of a set of stepped spur gears 22a, etc., fast on a counter shaft 23. Counter shaft 23 is also a driven shaft of the mechanism and has fast on it a free-wheeling clutch member 24 through which rotary motion of shaft 23 in one direction is transmitted to a second free-wheeling clutch member 25 that is normally loosely mounted on counter shaft 23. Clutch member 25 has a hub portion formed exteriorly with gear teeth 26 to mesh with a gear 27 that is splined upon the driven shaft 2. The hub of gear 27 is made with an annular groove 28 for engagement with a shipper member, not shown, by means of which gear 27 is adjusted axially on shaft 2 to move it into and out of engagement with gear teeth 26 and also to throw the mechanism into reverse. The means through which counter shaft 23 drives shaft 2 in reverse comprises a gear 29 fast on shaft 23, and an intermediate gear 29a with which the gear 27 is meshed when shifted toward the right, Fig. 1, out of mesh with gear 26.

A manually operated clutch member 30 splined on shaft 23 is provided upon its exterior, and near one end thereof, with teeth 31 so that when clutch member 30 is manually shifted toward the left, Fig. 1, its toothed portion enters a toothed socket 32 provided within the hub of clutch member 25 to lock the latter to counter shaft 23 thereby to suppress the free wheeling function of members 24 and 25.

When gear 27 is moved toward the right out of mesh with gear 26 it may be brought into mesh with intermediate gear 29a on a small arbor, not shown, which gear 29a is always in mesh with the gear 29 on counter shaft 23. Thus by shifting gear 27 toward the right as described, shaft 2 will be driven in reverse.

The spindle 4 carries four beveled gear segments a, b, c and d each disposed opposite one of the beveled gears on drums 16—19, inclusive, in position to co-operate therewith.

As shown in Figures 1 and 2 the segments a, b and c are made, respectively, with pairs of gear teeth a', b' and c', while the segment d is made with four gear teeth d'. The teeth b' are angularly offset in one direction with respect to the teeth a'; the teeth c' are angularly offset in the same direction with respect to the teeth b', and the group of teeth d' is angularly offset with respect to the teeth c', all as shown in Figure 2.

As shown in Fig. 2 the first tooth of segment a is interlocked with the conical gear of sleeve 19 and as segment a is carried bodily around shaft 1, while held against rotating on its own axis by spring 8 acting through gear 7, it acts to rotate cylinder 19, gear 22a and shaft 23, and the latter acts through the free-wheeling clutch 24—25 to rotate gear 27 and the driven shaft 2. So long as the load imposed by shaft 2 is no greater than the power of spring 8, the spindle 4 and segment a will swing around the axis of shaft 1 without rotary motion on their own axes and without relative movement between crown gear 7 and shaft 1 or gear 6.

If the load imposed by shaft 2 becomes greater than the power of spring 8, then the latter will yield and segment a will roll forwardly on cylinder 19 thereby rotating spindle 4 and gear 6 in a direction to advance crown gear 7 relatively to shaft 1 with the result that the tension of spring 8 is increased until its resistance balances the load or until segment a rolls out of mesh with the teeth of drum 19. If the partial rotation of segment a does not sufficiently increase the tension of spring 8 to overcome the resistance to rotation of drum 19 and shafts 2 and 23, then segment a will continue to roll on drum 19 until its second tooth is in engagement with said drum 19 thereby further increasing the tension of spring 8. If this increased tension of spring 8 is still insufficient to hold segment a against rotating on its own axis the segment a will continue to roll on drum 19 thereby acting through spindle 4 and gear 6 to advance crown gear 7 still further and further increasing the tension of spring 8. If the resistance of drum 19 is still greater than the resistance of spring 8 the spindle 4 will continue to be rotated until the second tooth passes out of engagement with drum 19 simultaneously with which the first tooth of segment b engages its drum 18 so that shaft 23 is driven through the parts 18 and 22b.

During the operations just described the gear b is being turned on its axis with the gear a and when the latter disengages drum 19 the first tooth of gear b is in engagement with its drum 18.

It will thus be clear that thereafter if the tension of spring 8 continues insufficient to hold segment b against rolling forwardly on its drum 18 the segment b will roll on drum 18 thereby increasing the tension of the spring 8 until the power of said spring is equal to the load, or until segment b moves out of engagement with drum 18 and segment c into engagement with drum 17. If the tension of spring 9 continues insufficient to hold segment c against rolling forwardly on its drum 17 said segment will roll forwardly on said drum 17 thereby further increasing the tension of spring 8 until said segment c disengages drum 17 and segment d has engaged drum 16.

Drum 16 is part of the lowest speed train of gearing through which shaft 1 drives shafts 23 and 2 and if the resistance of drum 16 to rotation exceeds the maximum increase in the power of spring 8 resulting through the engagement of segment d with drum 16, then sleeve 11 can be adjusted inwardly to still further increase the power of spring 8 and this is the limit of the driving capacity of the mechanism.

Each of the segments a, b, c and d is formed upon its top side with an arcuate recess 34 that is occupied by a lug 35 forming part of the spindle 4, and the recess 34 is of angular length sufficient to permit its gear to move relatively to spindle 4 to a limited extent.

Housed within a chamber 36 formed within each segment a, etc., below its recess 34 is a coiled spring 37 which normally maintains one end of recess 34 against one side of its lug 35. When either beveled gear b, c or d is first brought into engagement with its drum the spring 37 yields and the rotation of said segment on the axis of spindle 4 is arrested because of the yielding nature of spring 37, until the second tooth of the segment that is moving out of mesh with its drum clears the latter.

The spindle 4 serves as a fulcrum for a lever which when the mechanism is in operation, is subjected to the influence of two opposed forces, viz., the resistance offered by the load imposed by shafts 23 and 2 upon one arm of this lever and the tension or resistance of spring 8 acting through the crown gear upon the other arm thereof. One arm of this lever is constituted, or represented, by the portion of the beveled gear a, b, c or d that extends from the axis of spindle 4 to the tooth thereof that is in engagement with one of the drums while the other arm is represented by the portion of beveled gear 6 which extends from the axis of spindle 4 to its point of engagement with crown gear 7.

The fulcrum and driving spindle 4 extends radially from the shaft I and because of its movement around the axis of the latter after the manner of a crank arm acts through one arm of the lever just mentioned to drive the driven shaft while the tension of spring 8 is imposed upon the other arm of the lever in a direction to hold said lever against rotative displacement on the fulcrum 4.

As above described the effective power of the mechanism as applied to shaft 23 or 2 is automatically varied according to variations in the load imposed by the driven shaft or shafts. Thus when the load is at its minimum the drive is through the segment a and it would, therefore, be almost impossible to go at a low speed in roads where low speed is required because of traffic or for other reasons. In such cases the sleeve II is adjusted longitudinally outwardly on prime power shaft I so as to reduce the strength of spring 8 with the result that the drive is automatically shifted from one segment on spindle 4 to the next until the strength of spring 8 is reduced to a point where the speed of the vehicle is reduced to the desired point. This transfer of the drive from one segment a, b or c to the next in order to reduce the speed of the vehicle is occasioned by outward longitudinal adjustment of sleeve II on shaft I.

It will be observed that shaft 2 can be driven at any one of four speeds when the mechanism is set in reverse.

When segment d is driving its drum 16 the mechanism is in first speed; when segment c is driving its drum 17 the mechanism is in second speed; when segment b is driving its drum 18 the mechanism is in third speed, and when segment a is driving its drum 19 the mechanism is in fourth speed.

It will be observed that the free-wheeling devices 24 and 25 may function for all four speeds of the mechanism. Also that this function can be suppressed by means of clutch member 30 when the mechanism is thrown into reverse.

Herein I have embodied my invention in a mechanism such as would be incorporated in an automobile in which case the shaft 2 is the driven element and is connected through the usual differential with the driving wheels of the vehicle. However, in some forms of my invention the shaft 2, gear 27, gear 26 and gear 29 may be dispensed with, in which case the shaft 23 is the driven element of the mechanism.

When the above described transmission is operating under an unvarying load one or the other of the segments a, etc., is in mesh with its drum 16, 17, 18 or 19 and there is no relative movement between said two parts, the segment and its drum traveling as one around the axis of the driving shaft I. It will be noted that when segment a is driving drum 19 the latter acts through the countershaft 23 to idly rotate the other three drums in the same direction but at greater speeds. It will also be observed that when segment b is the driver its drum 18 acts through countershaft 23 to drive drum 19 at a slower speed than drum 18 and drums 17 and 16 at greater speed than said drum 18. Thus while the mechanism is in operation all of the drums are rotating but at different speeds. While traveling under an unvarying load the spindle 4, swinging around the axis of shaft I after the manner of a crank arm, carries with it the beveled gear 6 as well as the segments and gear 7. Gear 6 and the drum or cylindrical gear that is then functioning all rotate together around the axis of drive shaft I in unison as indicated by the arrows in Fig. 2 and there will be no relative movement between those parts. When, however, the load becomes greater than the tension of the spring 8, the movement of the drum will be retarded thereby rotating shaft 4 on its axis in a direction to advance gear 7 in the direction of the arrow, Fig. 2, thereby increasing the resistance of spring 8 until said resistance balances the increase in load. So also, when the load decreases the shaft 4 lags behind relatively to the drum thereby adjusting gear 7 in a direction opposite to the arrow in Fig. 2 and decreasing the tension of spring 8 until said tension again balances the load.

What I claim is:

1. In a transmission mechanism, the combination of a driving shaft; a driven shaft; a spindle carried by said driving shaft and disposed crosswise thereof; a plurality of segmental beveled gears mounted side by side on said spindle so as to swing around the axis of said driving shaft; a plurality of telescopically associated hollow drums that are concentrically disposed with relation to the axis of said driving shaft and each of which is made at one end with a bevel gear co-operatively disposed with respect to one of said segmental beveled gears and made at its opposite end with a spur gear, the spur gears of the several drums being of different diameters; a plurality of spur gears fixed in position upon said driven shaft each of which is continuously in mesh with the spur gear of one of said drums, and automatic means for operating said spindle so as to selectively control the engagement of said segmental beveled gears individually with the beveled gears of said drums according to variations in the load imposed upon said mechanism by said driven shaft.

2. In a transmission mechanism, the combination of a driving shaft; a driven shaft; a spindle carried by said driving shaft and disposed radially thereof; a plurality of segmental beveled gears mounted side by side on said spindle so as to swing around the axis of said driving shaft; a plurality of telescopically associated hollow drums that are concentrically disposed with relation to the axis of said driving shaft and each of which is made at one end with a beveled gear cooperatively disposed with respect to one of said beveled segmental gears and at its opposite end with a spur gear, the spur gears of the several drums being of different diameters; a plurality of spur gears fixed in position upon said driven shaft each of which is continuously in mesh with the spur gear of one of said drums, a beveled gear fast on said spindle; a beveled gear loosely mounted on said driving shaft and engaging said last mentioned beveled gear, and a spring having one end thereof cooperatively associated with said driving shaft and its opposite end cooperatively associated with said loosely mounted gear so as to yieldingly oppose rotary motion of said loosely mounted beveled gear relatively to said driving shaft under the influence of an increase in the load imposed upon said loosely mounted gear by said driven shaft.

3. A transmission mechanism constructed in accordance with claim 2 wherein manually operable means is provided for varying the power of said spring thereby to control the speed of said driven shaft.

4. A transmission mechanism having, in combination, a driving shaft; a driven shaft, and mechanism through which power is transmitted from said driving shaft to said driven shaft, said mechanism comprising a shaft rotatably supported by said driving shaft and disposed radially with respect to the axis of the latter, a plurality of gear segments spirally arranged on said radial shaft at different distances from the axis of said driving shaft, a plurality of gear members for rotating said driven shaft, each of said members being cooperatively associated with one of said gear segments so that it is at times rotated thereby, and spring means connecting said driving shaft with said radial shaft for yieldingly opposing rotative displacement in one direction of said radial shaft and its gear segments under the influence of a dominating increase in the load thereby to selectively control the action of the gear segments so as to equalize the effective force of said spring means and the load, and for yieldingly urging said radial shaft and its gear segments to turn in the opposite direction in response to a decrease in the load thereby to selectively control the action of the gear segments so as to equalize the effective force of said means and the load.

5. A transmission mechanism constructed in accordance with claim 4, and including also manually operable means through which the power of said spring means is varied to control the speed of said driven shaft.

6. A transmission mechanism constructed in accordance with claim 2 wherein said spring is a coiled spring surrounding said driving shaft having one of its ends fastened to said loosely mounted beveled gear and including also a sleeve rotatably supported within said coiled spring by said driving shaft and to which the opposite end of said spring is fastened, and means normally holding said sleeve against rotation relatively to said driving shaft, said means being manually operable to rotatively adjust said sleeve relatively to said driving shaft.

7. A transmission mechanism constructed in accordance with claim 1 wherein each segmental beveled gear is connected with said spindle so that it is rotatively movable thereon to a limited extent and wherein a spring is provided for holding each of said segmental beveled gears at the limit of its rotary movement in one direction with respect to said spindle.

MATTEO NATELLA.